(No Model.)
J. F. FURNAS.
Animal Poke.
No. 237,853.                    Patented Feb. 15, 1881.
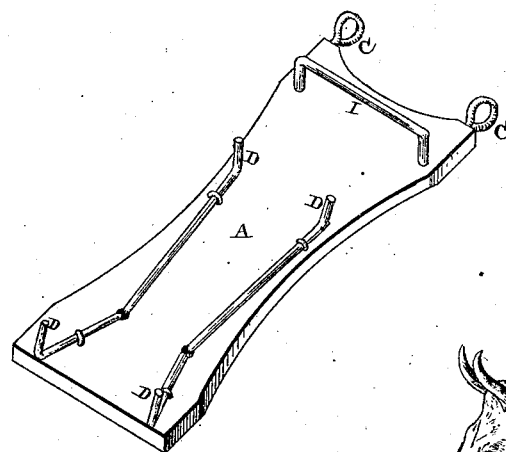
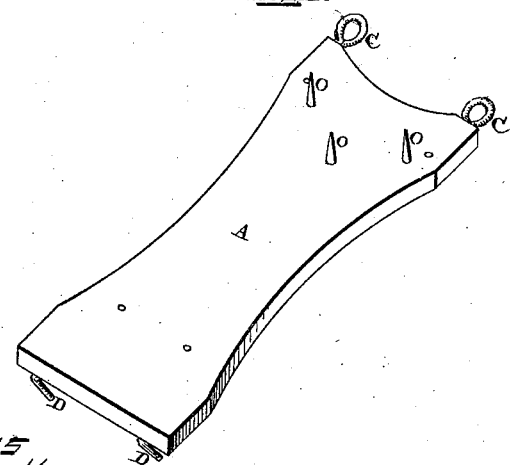
Witnesses
Wm W. Mortimer
A. C. Kondruck
Inventor
J. F. Furnas,
per
F. A. Lehmann,
Atty.

UNITED STATES PATENT OFFICE.

JEREMIAH F. FURNAS, OF DYSART, IOWA.

ANIMAL-POKE.

SPECIFICATION forming part of Letters Patent No. 237,853, dated February 15, 1881.

Application filed October 4, 1880. (No model.)

*To all whom it may concern:*

Be it known that I, JEREMIAH F. FURNAS, of Dysart, in the county of Tama and State of Iowa, have invented certain new and useful Improvements in Animal-Pokes; and I do hereby declare the following to be a full, clear, and exact description of the invention, such as will enable others skilled in the art to which it pertains to make and use it, reference being had to the accompanying drawings, which form part of this specification.

My invention relates to an improvement in devices for preventing animals from jumping fences; and it consists in a suitable wooden or metallic plate, which is hung around the animal's neck by means of a suitable strap, cord, or wire, and which plate is provided with hooks upon its front side to catch under the rails, bars, or wires of the fence, and a guard which extends across the upper end of the plate, so as to prevent the animal's head from coming in contact with the hooks, and the sharp pricking devices upon its rear side, so as to prick the animal while pressing against the fence, as will be more fully described hereinafter.

The object of my invention is to provide a light simple device which can be hung upon the neck of any animal, and which will serve to prevent it from jumping the fence.

Figures 1 and 2 are perspectives of my invention taken from opposite sides. Fig. 3 is a side elevation of my device as applied to the neck of an animal.

A represents a suitable wooden or metallic plate, of any desired length or shape, and which is to be attached around the animal's neck by means of the eyes C on its upper end, and a cord, strap, or wire. Upon the front side of this plate, at any suitable distance apart, are either formed or secured a number of hooks, D, which catch under the rails, bars, or wires of a fence, and cause the plate not only to be forced upward against the animal's breast, but at the same time prevent it from raising upward in front so as to jump the fence. This device is specially useful in preventing cattle from creeping or going through wire, board, or rail fences, for the points D catch against the rails or wires, and by causing the points o to prick the animal force it to pull back, and after the animal has been punished a few times it keeps away from the fences altogether.

Secured to or formed with the plate, at any suitable distance below its upper end, is a guard, I, which extends across the plate and projects out far enough to prevent the animal's head from being brought in contact with the hooks. Where this guard is not used the plate is constantly liable to hurt or injure the animal, when it lowers its head to feed, by having the points D strike the animal's jaws.

Projecting from the rear side of this plate are a number of pricking-points, O, which, when the plate is pushed backward by the hooks catching against the fence, or when the plate bears against any object, prick the animal and cause it to back away from the fence without attempting to jump.

Having thus described my invention, I claim—

A device for preventing animals from jumping fences, composed of a suitable plate having hooks upon its front side to catch against the fence, and a guard near its upper end to prevent the animal's head from striking against the hooks, and having projecting from its rear side a number of pricking-points, substantially as shown and described.

In testimony that I claim the foregoing I have hereunto set my hand this 27th day of September, 1880.

JEREMIAH F. FURNAS.

Witnesses:
W. W. FURNAS,
JOHN P. TILLER.